(12) United States Patent
Jang et al.

(10) Patent No.: US 12,095,092 B2
(45) Date of Patent: Sep. 17, 2024

(54) ELECTRODE FOR SECONDARY BATTERY AND METHOD FOR PREPARING THE SAME

(71) Applicant: SK On Co., Ltd., Seoul (KR)

(72) Inventors: Hyun Joong Jang, Daejeon (KR); Min Hwan Kim, Daejeon (KR); Sung Jun Park, Daejeon (KR); Byoung Wook Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 226 days.

(21) Appl. No.: 17/403,948

(22) Filed: Aug. 17, 2021

(65) Prior Publication Data

US 2022/0059844 A1    Feb. 24, 2022

(30) Foreign Application Priority Data

Aug. 18, 2020 (KR) .................. 10-2020-0103327

(51) Int. Cl.
| | |
|---|---|
| *H01M 4/62* | (2006.01) |
| *H01M 4/04* | (2006.01) |
| *H01M 4/139* | (2010.01) |
| *H01M 10/0525* | (2010.01) |

(52) U.S. Cl.
CPC ......... *H01M 4/622* (2013.01); *H01M 4/0404* (2013.01); *H01M 4/139* (2013.01); *H01M 10/0525* (2013.01)

(58) Field of Classification Search
CPC .... H01M 4/622; H01M 4/0404; H01M 4/139; H01M 10/0525; H01M 2004/027; H01M 2004/028; H01M 4/13; H01M 4/623; H01M 4/624; H01M 10/052; H01M 4/0409; Y02E 60/10
See application file for complete search history.

(56) References Cited

U.S. PATENT DOCUMENTS

| | | | |
|---|---|---|---|
| 2014/0295248 A1 | 10/2014 | Hotta et al. | |
| 2018/0006291 A1* | 1/2018 | Kim | ......................... H01M 4/13 |
| 2021/0119200 A1 | 4/2021 | Nam | |

FOREIGN PATENT DOCUMENTS

| | | |
|---|---|---|
| JP | 2015-179565 A | 10/2015 |
| KR | 1020140080837 A | 7/2014 |
| KR | 1020190064480 A | 6/2019 |

* cited by examiner

*Primary Examiner* — Anca Eoff
(74) *Attorney, Agent, or Firm* — The Webb Law Firm

(57) ABSTRACT

An electrode for a secondary battery includes: an electrode current collector; and an electrode mixture layer formed on at least one surface of the electrode current collector. Based on a region corresponding to 50% of a thickness of the electrode mixture layer in a direction in which the electrode mixture layer is formed from a surface of the electrode current collector, a ratio (B/A) of cohesive force (A) between an electrode active material and a binder or between adjacent binders included in a lower region, and cohesive force (B) between an electrode active material and a binder or between adjacent binders included in an upper region is less than 1.5.

4 Claims, 1 Drawing Sheet

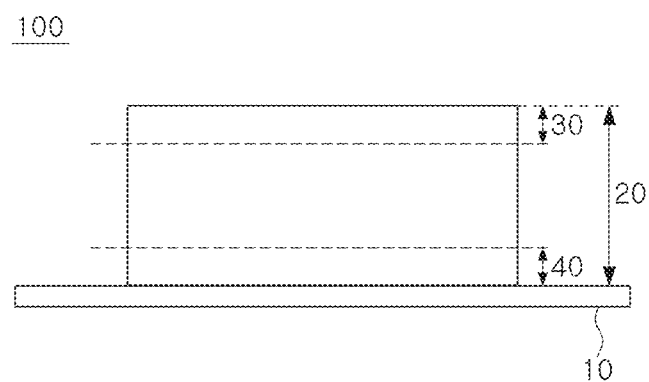

ELECTRODE FOR SECONDARY BATTERY AND METHOD FOR PREPARING THE SAME

CROSS-REFERENCE TO RELATED APPLICATION

This application claims priority to Korean Patent Application No. 10-2020-0103327 filed Aug. 18, 2020, the disclosure of which is hereby incorporated by reference in its entirety.

BACKGROUND OF THE INVENTION

Field of the Invention

The present disclosure relates to an electrode for a secondary battery, and a method for manufacturing the same, and more particularly, to an electrode for a secondary battery in which cohesive force between an active material and a binder in the electrode, or between adjacent binders is optimized, and a method for manufacturing the electrode.

Description of Related Art

Recently, devices using electricity as an energy source are increasing. As applications using electricity such as smartphones, camcorders, notebook PCs, electric vehicles, and the like expand, interest in electric storage devices using electrochemical devices is increasing. Among various electrochemical devices, there is high demand for lithium secondary batteries capable of charging and discharging electricity, having a high operating voltage, and having high energy density.

Main elements constituting a lithium secondary battery are a positive electrode, a negative electrode, an electrolyte, and a separator. The positive electrode and the negative electrode serve to provide a place for an oxidation-reduction reaction to occur, the electrolyte serves to transfer lithium ions between the positive electrode and the negative electrode, and the separator serves to insulate the battery so that the positive electrode and the negative electrode do not stick together. According to an operating principle of a lithium ion battery, during discharging, lithium is oxidized to lithium ions in the negative electrode, which then move to the positive electrode through the electrolyte, and the generated electrons move to the positive electrode through an external conductor. In the positive electrode, lithium ions that have moved from the negative electrode are inserted and accept electrons to cause a reduction reaction. Conversely, during charging, an oxidation reaction occurs in the positive electrode and a reduction reaction occurs in the negative electrode.

In addition, as an interest in environmental issues is increasing, as a demand base for high-capacity batteries expands according to a growth of a market for devices employing high-capacity batteries such as electric vehicles and hybrid electric vehicles that can replace vehicles using fossil fuels such as gasoline vehicles, diesel vehicles, and the like, which are one of the main causes of air pollution, it is required to design high-capacity electrodes for manufacturing lithium secondary batteries with high energy density, high output and high discharge voltage as a power source for these devices.

Accordingly, a high-loading electrode having an increased amount of active material has been attempted to design a high-capacity electrode, but in this high-loading design, migration of the binder occurs during a drying process, resulting in an overvoltage of the negative electrode, an increase in electrode resistance, and accordingly, there are problems such as deterioration of lifespan characteristics and peeling of the electrode, and accordingly, it is necessary to address such problems.

SUMMARY OF THE INVENTION

The present disclosure has been devised in view of the above circumstances, and an aspect of the present disclosure is to provide an electrode for a secondary battery in which cohesive force between an active material and a binder in the electrode, or between adjacent binders is optimized and a method for manufacturing the electrode.

According to an aspect of the present disclosure, an electrode for a secondary battery is provided. The electrode for a secondary battery includes: an electrode current collector; and an electrode mixture layer formed on at least one surface of the electrode current collector, wherein based on a region corresponding to 50% of a thickness of the electrode mixture layer in a direction in which the electrode mixture layer is formed from a surface of the electrode current collector, a ratio (B/A) of cohesive force (A) between an electrode active material and a binder or between adjacent binders included in a lower region, and cohesive force (B) between an electrode active material and a binder or between adjacent binders included in an upper region is less than 1.5.

Based on a direction in which an electrode mixture layer is formed from the surface of the electrode current collector, the lower region is a region corresponding to a thickness of 15% or less of the electrode mixture layer (excluding 0%) from a surface of the electrode current collector based on the total thickness of the electrode mixture layer, and the upper region may be a region corresponding to a thickness of 85 to 100% of the electrode mixture layer from the surface of the electrode current collector based on the total thickness of the electrode mixture layer.

The electrode mixture layer may further include a conductive material.

The electrode may be a positive electrode or a negative electrode.

According to another aspect of the present disclosure, a method for manufacturing an electrode for a secondary battery includes operations of: providing an electrode current collector; applying a first electrode slurry to the electrode current collector; applying a second electrode slurry to the first electrode slurry; and drying and rolling the electrode current collector coated with the first and second electrode slurries, wherein an amount of a binder included in the first electrode slurry is greater than an amount of a binder included in the second electrode slurry.

The amount of the binder included in the first electrode slurry is 2 to 10% by weight based on a total weight of the first electrode slurry, and the amount of the binder included in the second electrode slurry is 6% by weight or less based on a total weight of the second electrode slurry.

The binder included in the first electrode slurry and the second electrode slurry may be one or more selected from styrene butadiene rubber (SBR), polyvinylidene fluoride, vinyl alcohol, carboxymethyl cellulose (MC), starch, hydroxypropyl cellulose, regenerated cellulose, polyvinyl. It may be at least one selected from polyvinylpyrrolidone, polytetrafluoroethylene, polyethylene, polypropylene, ethylene-propylene-diene terpolymer (EPDM), sulfonated EPDM, and fluororubber.

The first and second electrode slurries may further include a conductive material.

The electrode may be a positive electrode or a negative electrode.

BRIEF DESCRIPTION OF THE DRAWING

The above and other aspects, features, and advantages of the present disclosure will be more clearly understood from the following detailed description, taken in conjunction with the accompanying drawings, in which:

The FIGURE schematically illustrates a lower region and an upper region that are symmetrical based on a region corresponding to a thickness of 50% thereof in a direction in which an electrode mixture layer is formed from a surface of an electrode current collector.

DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, exemplary embodiments will be described with reference to various examples. However, embodiments of the present disclosure may be modified in various other forms, and the scope of the present disclosure is not limited to the embodiments described below.

The present disclosure relates to a method for manufacturing an electrode and to a secondary battery including the electrode manufactured thereby, and more particularly, to a method for manufacturing an electrode for a secondary battery in which cohesive force between an active material and a binder in the electrode, or between adjacent binders is optimized, and a secondary battery including the electrode.

According to an aspect of the present disclosure, an electrode for a secondary battery 100 is provided. The electrode for a secondary battery 100 includes: an electrode current collector 10; and an electrode mixture layer 20 formed on at least one surface of the electrode current collector 10, wherein based on a region corresponding to 50% of a thickness of the electrode mixture layer in a direction in which the electrode mixture layer is formed from a surface of the electrode current collector, a ratio (B/A) of cohesive force (A) between an electrode active material and a binder or between adjacent binders included in a lower region 40, and cohesive force (B) between an electrode active material and a binder or between adjacent binders included in an upper region 30 is less than 1.5.

The binder included in the electrode mixture layer of the secondary battery is used to improve bonding force between the active material and the conductive agent, and in a drying process for manufacturing an electrode, the binder moves to an upper portion of the electrode mixture layer and is localized, causing a difference in mobility of lithium ions in a lithium ion battery, acting as one of the causes of deterioration of cell performance. Specifically, during manufacturing an electrode, localization of the binder occurs in an upper layer portion of the electrode active material layer where an electrode active material and a separator face during the drying process, such that the binder is less distributed in a lowermost layer portion of the electrode active material layer where an electrode active material and a current collector face. As a result, adhesive force between the electrode active material and the current collector decreased, resulting in deterioration of cycle characteristics, leading to a decrease in battery life. The binder biased on the uppermost layer portion of the electrode active material layer interferes with lithium ion diffusion during charging, thereby increasing an interfacial resistance of the electrode.

However, according to the present disclosure, an electrode with an optimized ratio of cohesive force between the electrode active material and the binder included in the lower region 40 and the upper region 30, symmetrical based on the region corresponding to 50% of the thickness of the electrode mixture layer 20 in the direction in which the electrode mixture layer 20 is formed from the surface of the electrode current collector 10, or between adjacent binders is provided. Accordingly, the binder in the electrode mixture layer 20 is uniformly distributed and the lifespan characteristics are improved, and further a peeling phenomenon of the electrode can be prevented.

The FIGURE schematically illustrates a lower region 40 and an upper region 30 that are symmetrical based on a region corresponding to 50% of the thickness thereof in a direction in which an electrode mixture layer 20 is formed from a surface of an electrode current collector 10. According to an embodiment of the present disclosure, it is preferable that a ratio (B/A) of a ratio of cohesive force (A) between an electrode active material and a binder included in a lower region of the electrode mixture layer 20, or adjacent binders, and cohesive force (B) between an electrode active material and a binder included in an upper region of the electrode mixture layer 20, or adjacent binders, symmetrical based on a region corresponding to 50% of a thickness of an electrode mixture layer 20 in a direction in which the electrode mixture layer 20 is formed from a surface of an electrode current collector 10, that is, based on an imaginary center line of the thickness of the electrode mixture layer 20, is less than 1.5. When the ratio is 1.5 or more, resistance of a cell increases and lifespan characteristics, rate characteristics, and temperature characteristics may decrease, while a phenomenon of peeling between the electrode current collector and the electrode mixture layer 20 may occur.

Meanwhile, an upper region 30 and a lower region 40 that are symmetrical based on the imaginary center line of the electrode mixture layer 20 are not particularly limited. For example, the lower region 40 is a region corresponding to a thickness of 15% or less (excluding 0%) from the surface of the electrode current collector 10 based on a total thickness of the electrode current collector 10, for example, may be a region corresponding to a thickness of 0.01 to 15%, 0.1 to 15%, or 1 to 15%, and the upper region 30 may be a region corresponding to a thickness of 85 to 100% of the electrode mixture layer 20 from the electrode mixture layer 20.

Meanwhile, the cohesive force in the corresponding region may be measured using a Surface And Interfacial Cutting Analysis System (SAICAS) device, which is obvious to those skilled in the art, and thus a detailed description thereof will be omitted.

According to another aspect of the present disclosure, a method of manufacturing an electrode for a secondary battery is provided. The method of manufacturing the electrode for a secondary battery includes operations of: providing an electrode current collector; applying a first electrode slurry to the electrode current collector; applying a second electrode slurry to the first electrode slurry; and drying and rolling the electrode current collector on which the first and second electrode slurries are coated, wherein an amount of the binder included in the first electrode slurry is greater than an amount of the binder included in the second electrode slurry.

An electrode according to the present disclosure may be a negative electrode or a positive electrode. When the electrode is a negative electrode, a thin plate made of copper, stainless steel, or nickel may be used as a negative electrode current collector, and a porous body such as a mesh or mesh shape may be used, and it may be coated with an oxidation-resistant metal or alloy film to prevent oxidation. When the electrode is a positive electrode, a thin plate made of aluminum, stainless steel, or nickel may be used as a positive electrode current collector, and similarly, a porous body such as a mesh or mesh shape may be used, and it may be coated with an oxidation-resistant metal or alloy film to prevent oxidation.

An operation of applying a first electrode slurry including a first electrode active material on the electrode current collector is performed, and an operation of applying a second electrode slurry including a second electrode active material on the first electrode slurry is performed. According to an embodiment of the present disclosure, it is preferable that the amount of the binder included in the first electrode slurry is greater than the amount of the binder included in the second electrode slurry. When the electrode slurry is coated in multiple layers, and accordingly, even if the binder is unevenly distributed toward an upper layer portion of the electrode mixture layer in any one electrode mixture layer, when viewed as a whole, the binder may be uniformly distributed throughout the electrode mixture layer.

In addition, since an amount of the binder coated on the electrode current collector, and included in the first electrode slurry is greater than an amount of the binder coated on the first electrode slurry, and included in the second electrode slurry, relatively, the first binder included in the first electrode slurry may move to an upper layer portion to optimize a ratio of cohesive force between the electrode active material and the binder or between adjacent binders.

The amount of the binder included in the first electrode slurry is preferably 2 to 10% by weight based on the total weight of the first electrode slurry. If it is less than 2% by weight, peeling of the electrode mixture layer from the electrode current collector may occur, and if it exceeds 10% by weight, resistance may be excessively increased due to an excessive content of binder.

The amount of the binder included in the second electrode slurry is preferably 6% by weight or less based on the total weight of the second electrode slurry. When it exceeds 6 wt %, resistance may be excessively increased due to the excessive content of binder.

The binder included in the first electrode slurry and the second electrode slurry may be the same or different from each other. The first and second binders are not particularly limited, but for example, may be one or more selected from polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber (SBR) and fluororubber, and preferably, styrene butadiene rubber can be used.

Meanwhile, an electrode active materials included in the first electrode slurry and the second electrode slurry may also be the same or different from each other. As a negative active material included in the negative electrode mixture layer, a commonly used negative active material may be used. As the negative active material, a carbon-based material, silicon, silicon oxide, silicon-based alloy, silicon-carbon-based material composite, tin, tin-based alloy, tin-carbon composite, metal oxide, or a combination thereof may be used, and lithium metal and/or a combination thereof and lithium metal alloys may be included.

In addition, a positive electrode active material included in the positive electrode mixture layer is not particularly limited as long as it can secure sufficient capacity. For example, the positive electrode active material may include one or more selected from a group consisting of lithium cobalt oxide, lithium nickel cobalt manganese oxide, lithium nickel cobalt aluminum oxide, lithium iron phosphorous oxide, and lithium manganese oxide, but is not necessarily limited thereto and any positive active material available in the art may be used.

The positive active material may be, for example, a compound represented by the following formula: $Li_aA_{1-b}M_bD_2$ (wherein, $0.90 \leq a \leq 1.8$, $0 \leq b \leq 0.5$); $Li_aE_{1-b}MbO_{2-c}D_c$ (wherein, $0.90 \leq a \leq 1.8$, $0 \leq b \leq 0.5$, $0 \leq c \leq 0.05$); $LiE_{2-b}M_bO_{4-c}D_c$ (wherein, $0 \leq b \leq 0.5$, $0 \leq c \leq 0.05$); $LiaNi_{1-b-c}Co_bM_cD_\alpha$ (wherein, $0.90 \leq a \leq 1.8$, $0 \leq b \leq 0.5$, $0 \leq c \leq 0.05$, $0 < \alpha \leq 2$); $Li_a Ni_{1-b-c}Co_bMcO_{2-\alpha}X_\alpha$ (wherein, $0.90 \leq a \leq 1.8$, $0 \leq b \leq 0.5$, $0 \leq c \leq 0.05$, $0 < \alpha < 2$); $Li_aNi_{1-b-c}CO_bMcO_{2-\alpha}X_2$ (wherein, $0.90 \leq a \leq 1.8$, $0 \leq b \leq 0.5$, $0 \leq c \leq 0.5$, $0 < \alpha < 2$); $Li_aNi_{1-b-c}Mn_bM_cD_\alpha$ (wherein, $0.90 \leq a \leq 1.8$, $0 \leq b \leq 0.5$, $0 \leq c \leq 0.5$, $0 < \alpha \leq 2$); $Li_aNi_{1-b-c}Mn_bM_cO_{2-\alpha}X_\alpha$ (wherein, $0.90 \leq a \leq 1.8$, $0 \leq b \leq 0.5$, $0 \leq c \leq 0.5$, $0 < \alpha < 2$); $Li_aNi_{1-b-c}Mn_bM_cO_{2-\alpha}X_2$ (wherein, $0.90 \leq a \leq 1.8$, $0 \leq b \leq 0.5$, $0 \leq c \leq 0.5$, $0 < \alpha < 2$); $Li_aNi_bE_cGdO_2$ (wherein, $0.90 \leq a \leq 1.8$, $0 \leq b \leq 0.5$, $0 \leq c \leq 0.5$, $0.001 \leq d \leq 0.1$); $Li_aNi_bCo_cMn_dGeO_2$ (wherein, $0.90 \leq a \leq 1.8$, $0 \leq b \leq 0.5$, $0 \leq c \leq 0.5$, $0 \leq d \leq 0.5$, $0.001 \leq e \leq 0.1$); $Li_aNiG_bO_2$ (wherein, $0.90 \leq a \leq 1.8$, $0.001 \leq b \leq 0.1$); $Li_aCoG_bO_2$ (wherein, $0.90 \leq a \leq 1.8$, $0.001 \leq b \leq 0.1$); $Li_aMnG_bO_2$ (wherein, $0.90 \leq a \leq 1.8$, $0.001 \leq b \leq 0.1$); $Li_aMn_2G_bO_4$ (wherein, $0.90 \leq a \leq 1.8$, $0.001 \leq b \leq 0.1$); $QO_2$; $QS_2$; $LiQS_2$; $V_2O_5$;

$LiV_2O_2$; $LiRO_2$; $LiNiVO_4$; $Li_{(3-f)}J_2(PO_4)_3$ (0≤f≤2); $Li_{(3-f)}Fe_2(PO_4)_3$ (wherein, 0≤f≤2); and $LiFePO_4$, wherein A in the above formula is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; J is V, Cr, Mn, Co, Ni, or Cu.

The positive active material may also include $LiCoO_2$, $LiMn_xO_{2x}$ (wherein, x=1 or 2), $LiNi_{1-x}Mn_xO_{2x}$ (wherein, 0<x<1), $LiNi_{1-x-y}Co_xMn_yO_2$ (wherein, 0≤x≤0.5, 0≤y≤0.5), $LiFePO_4$, $TiS_2$, $FeS_2$, $TiS_3$, or $FeS_3$, but is not limited thereto.

If necessary, the negative electrode mixture layer and the positive electrode mixture layer may further include a conductive material. The conductive material is not particularly limited as long as it has conductivity without causing a chemical change in the secondary battery of the present disclosure. For example, graphite, such as natural graphite and artificial graphite; carbon-based substances such as carbon black, acetylene black, ketjen black, channel black, furnace black, lamp black, and summer black; conductive fibers such as carbon fibers and metal fibers; carbon fluoride; metal powders such as aluminum and nickel powder; conductive whiskers such as zinc oxide and potassium titanate; conductive metal oxides such as titanium oxide; conductive materials such as polyphenylene derivatives may be used.

Coating, drying and rolling of the first and second electrode slurries may be performed by a method generally performed in the art. For example, a coating method using a slot die may be used for application, and in addition, a Mayer bar coating method, a gravure coating method, a dip coating method, a spray coating method, or the like may be used. Drying may be performed, for example, in a dry atmosphere at room temperature, and rolling may be performed by passing the negative electrode mixture layer formed on the negative electrode current collector by coating and drying through a metal rolling roll of calendering equipment.

Meanwhile, when the electrode slurry is dried at a high temperature, a production time may be reduced, while migration occurs greatly, and when the electrode slurry is dried at a low temperature, since a migration phenomenon is reduced, but a production time may be increased, it is desirable to appropriately control the temperature during drying.

As described above, in the electrode manufactured according to the present disclosure, the cohesive force between the active material and the binder in the electrode or between the adjacent binders may be optimized, thereby improving lifespan characteristics, and furthermore, it is possible peeling of the electrode may be prevented.

Hereinafter, the present disclosure will be described in more detail through specific examples. The following examples are only examples to help the understanding of the present disclosure, and the scope of the present disclosure is not limited thereto.

EXAMPLE

Example 1

A first slurry was prepared by mixing artificial graphite, carboxymethylcellulose (CMC) and styrene butadiene rubber (SBR) in a weight ratio of 96:1:3, and a second slurry was prepared by mixing artificial graphite, carboxymethylcellulose and styrene butadiene rubber in a weight ratio of 98:1:1.

The first slurry was coated on copper foil at 5 mg/cm$^2$, and then the second slurry was coated on the first slurry at 5 mg/cm$^2$, and then dried in an oven at 130° C. for 10 minutes. Thereafter, a negative electrode having electrode density of 1.6 g/cc was prepared by rolling.

Example 2

A negative electrode was prepared in the same manner as in Example 1, except that artificial graphite, carboxymethylcellulose and styrene butadiene rubber were mixed in a weight ratio of 95:1:4 in the first slurry, and artificial graphite and carboxymethylcellulose were mixed in a weight ratio of 99:1 in the second slurry.

Example 3

A negative electrode was prepared in the same manner as in Example 1, except that the first and second slurries were coated on the copper foil and dried in an oven at 60° C. for 300 minutes.

Comparative Example 1

A negative electrode was prepared in the same manner as in Example 1, except that only a first slurry in which artificial graphite, carboxymethylcellulose, and styrene butadiene rubber were mixed in a weight ratio of 97:1:2 was coated at 10 mg/cm$^2$.

A secondary battery including the negative electrodes of the Examples 1 to 3 and Comparative Example 1 was prepared, a direct current internal resistance (DC-IR) was measured, and whether peeling of the electrode or not was determined and shown in Table 1.

In addition, based on the direction in which the electrode mixture layer is formed from the electrode current collector, cohesive force (A) in a region corresponding to the thickness of 15% or less of the electrode mixture layer and based on the direction in which the electrode mixture layer is formed from the electrode current collector, cohesive force (B) in a region corresponding to the thickness of 85% or more of the mixture layer was measured using a SAICAS apparatus, and a ratio thereof was measured and shown in Table 1.

TABLE 1

| Example | Comparative Example 1 | Example 1 | Example 2 | Example 3 |
|---|---|---|---|---|
| Cohesive force (B) in a region corresponding to the thickness of 85% or more of the electrode mixture layer [N/mm] | 0.11 | 0.10 | 0.08 | 0.09 |
| Cohesive force (A) in a region corresponding to the thickness of 15% or less of the electrode mixture layer [N/mm] | 0.06 | 0.08 | 0.09 | 0.08 |

TABLE 1-continued

| Example | Comparative Example 1 | Example 1 | Example 2 | Example 3 |
|---|---|---|---|---|
| B/A | 1.83 | 1.26 | 0.89 | 1.13 |
| DC-IR [mΩ] | 1.26 | 1.19 | 1.11 | 1.16 |
| Peeling of electrode | O | X | X | X |

Referring to Table 1, in Comparative Example 1 having a B/A of 1.5 or more, it can be confirmed that DC-IR is higher than in Examples 1 to 3, and peeling of the electrode occurred.

As set forth above, according to embodiments, in a secondary battery including an electrode, a distribution of a binder in an electrode may be uniformly adjusted, and a cohesive force between an active material in the electrode and the binder, or between adjacent binders may be optimized, thereby improving lifespan characteristics, and further preventing peeling of the electrode may be prevented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DETAILED DESCRIPTION OF MAIN ELEMENTS

10: electrode current collector
20: electrode mixture layer
30: upper region
40: lower region
100: electrode

What is claimed is:

1. An electrode for a secondary battery, comprising:
an electrode current collector; and
an electrode mixture layer formed on at least one surface of the electrode current collector,
wherein based on a region corresponding to 50% of a thickness of the electrode mixture layer in a direction in which the electrode mixture layer is formed from a surface of the electrode current collector, a ratio (B/A) of cohesive force (A) between an electrode active material and a binder or between adjacent binders included in a lower region, and cohesive force (B) between an electrode active material and a binder or between adjacent binders included in an upper region is less than 1.5,
wherein, based on the direction in which the electrode mixture layer is formed from the surface of the electrode current collector, the lower region is a region corresponding to a thickness of 15% or less of the electrode mixture layer, excluding 0%, from the surface of the electrode current collector based on a total thickness of the electrode mixture layer,
wherein the upper region is a region corresponding to a thickness of 85 to 100% of the electrode mixture layer from the surface of the electrode current collector based on a total thickness of the electrode mixture layer, and
wherein the binder or at least one of the adjacent binders included in the electrode mixture layer comprises styrene butadiene rubber (SBR).

2. The electrode for a secondary battery of claim 1, wherein the electrode mixture layer further comprises a conductive material.

3. The electrode for a secondary battery of claim 1, wherein the electrode is a positive electrode.

4. The electrode for a secondary battery of claim 1, wherein the electrode is a negative electrode.

* * * * *